Aug. 13, 1929.　　　　　L. GARRIS　　　　　1,724,188
AUTOMATIC STABILIZER AND BRAKE FOR AEROPLANES
Filed Sept. 13, 1928　　　2 Sheets-Sheet 1
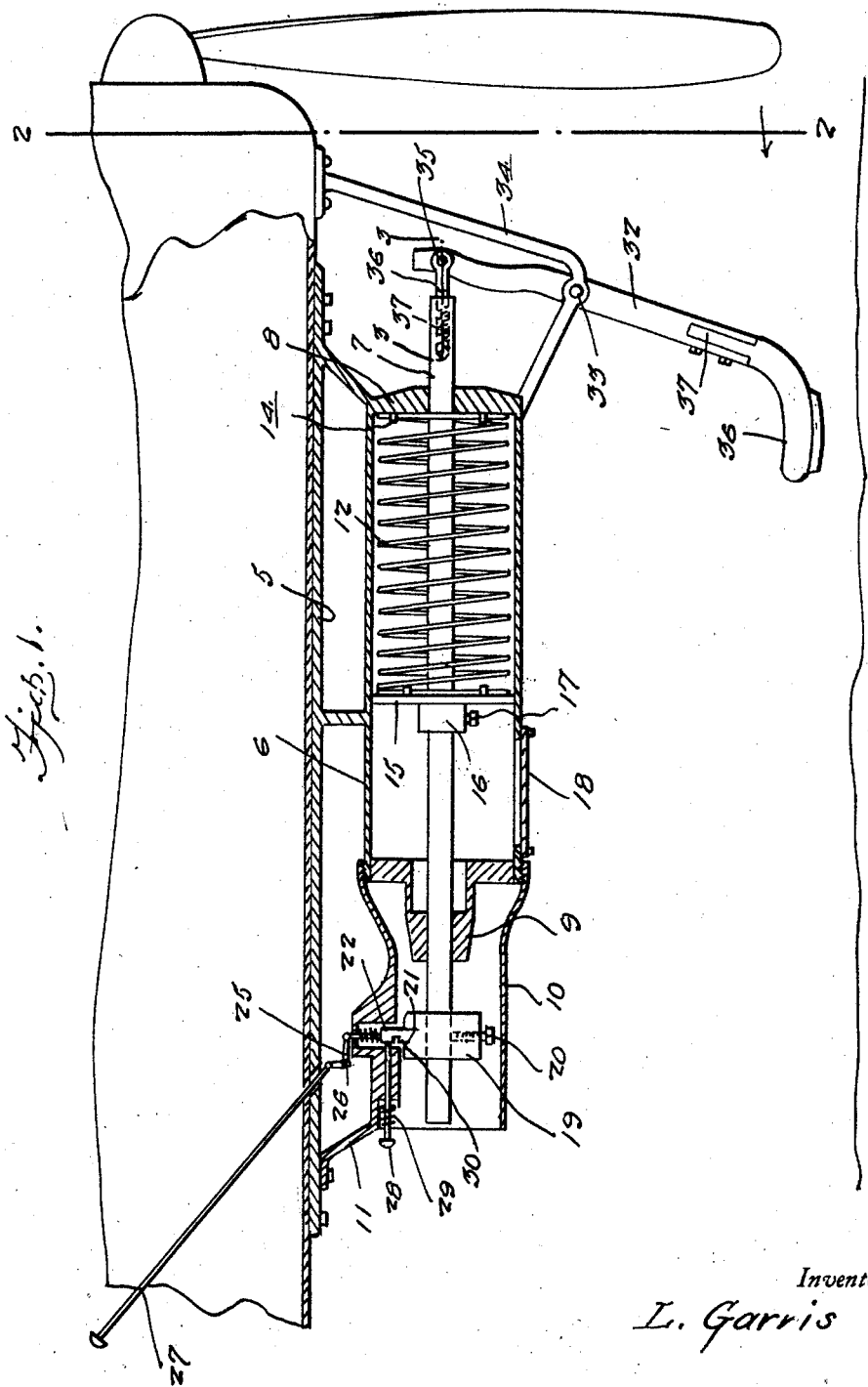
Inventor
L. Garris
By Clarence A. O'Brien
Attorney

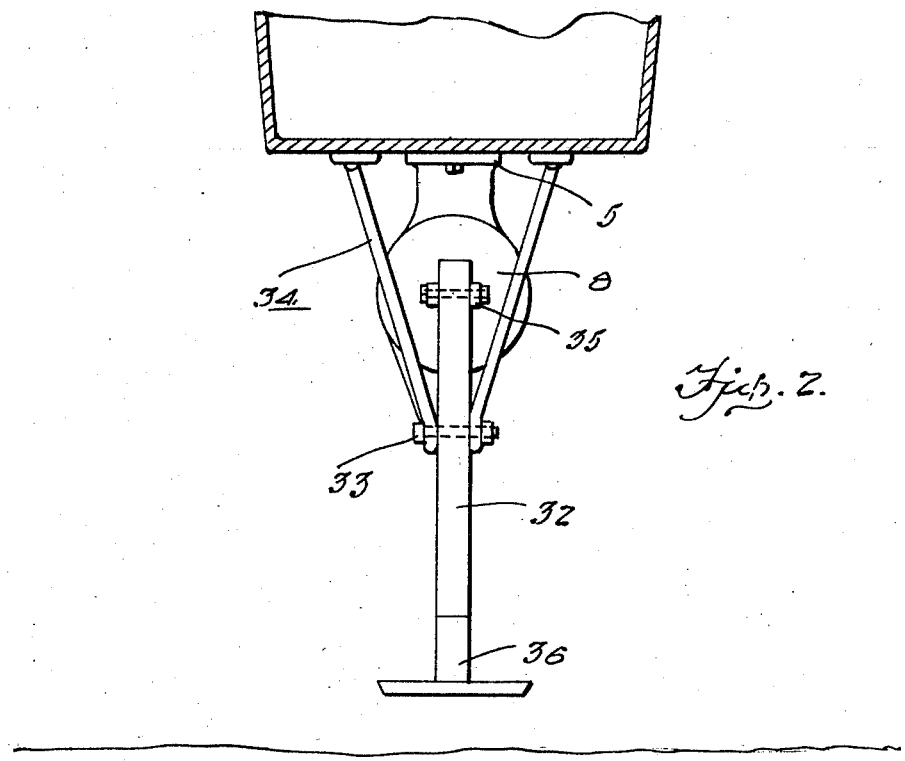
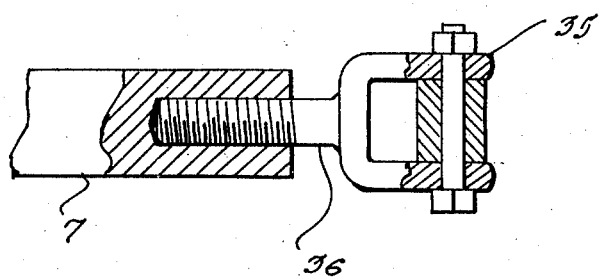

Patented Aug. 13, 1929.

1,724,188

UNITED STATES PATENT OFFICE.

LOYAL GARRIS, OF MICHIGAN CENTER, MICHIGAN.

AUTOMATIC STABILIZER AND BRAKE FOR AEROPLANES.

Application filed September 13, 1928. Serial No. 305,788.

The present invention relates to an automatic stabliizer for aeroplanes and the object and advantages thereof will become apparent as the description proceeds taken in conjunction with the accompanying drawings, wherein:

Figure 1 is a fragmentary longitudinal section through the forward end of an aeroplane showing my improved mechanism thereon, Figure 2 is a vertical section taken substantially on the line 2—2 of Figure 1, and Figure 3 is an enlarged detail section taken substantially on the line 3—3 of Figure 1.

Referring to the drawing in detail it will be seen that the numeral 5 denotes a bracket secured under the forward end of the fuselage and supports a cylinder 6 the axis of which is substantially horizontal and longitudinally of the fuselage.

A rod 7 is slidable through the head 8 at the forward end of the cylinder and through a bearing 9 at the rear end of the cylinder. A casing 10 is secured to the rear end of the cylinder and projects rearwardly being supported from the rear end of the bracket by an arm 11.

A spring 12 is disposed in the casing 6 about the rod 7 and is anchored at its forward end as at 14 to the head 8. The rear end of the spring is anchored to a plate 15 on a collar 16 adjustably engaged on the rod 7 by set screw 17.

An inspection closure plate is provided in the rear portion of the cylinder in order that adjustment of the collar 16 may be readily made. A collar 19 is adjustably mounted on the rod 7 to the rear of the bearing 8 in the casing 10, and is adjustably mounted by means of the set screw 20 and has a notch 21 formed therein.

A spring pressed cap 22 is mounted in the casing 10 and normally engaged in the notch 21 so that the spring 12 is under tension between plate 15 and the head 8. The catch is releasable by a bell crank 25 rockably mounted as at 26 and actuatable by a rod 27.

A latch 28 is spring actuated as is indicated at 29 so as to catch in a notch 30 provided in the catch 22 and the same is released out of engagement with the notch 21. A stabilizer arm 32 is rockably mounted intermediate its ends as at 33 on a bracket 34 and has pivotal engagement 35 with a yoke 36 having screw engagement 37 with the forward extremity of the rod 7.

This stabilizer and brake is a safety device which works automatically, thus on dangerous grounds it tends to support the heavy end of the plane, the motor, holding it in an upright position, as well as acting as a braking device.

In case of a forced landing where conditions are unknown, the pilot will release the control trigger or catch 22 putting the stabilizer in action saving a "crack up." The brake action is had at any time on the ground. The stabilizer arm as shown in the drawing is shut at working or cocked position and is set between the propeller and ground clearance of the same, thus putting it out of the way on the take off.

Where the ground is rough enough and in landing, the wheels of the plane are partially locked or the plane is thrown off, the stabilizer comes into immediate action.

The stabilizer arm comes in contact with the ground and is automatically triggered off, releasing the stored spring energy producing a forward movement of the bottom of the stabilizer arm, keeping it firm, yet flexible ground contacts, thereby supporting the front of the aeroplane.

Practically all parts are adjustable enabling the fine adjustment in action. After the stabilizer once trips, the trigger is held out of the way. The stabilizer arm at the bottom may be equipped with a wheel, pontoon, or as illustrated in the drawing, a flat broad shoe 36 adjustably mounted as at 37.

It is thought that the construction, utility and advantages of the invention will now be quite apparent without a more detailed description thereof.

The present embodiment of the invention has been disclosed merely for the purposes of exemplification since in actual practice it is simple in construction, strong and durable, inexpensive to construct, thoroughly efficient and reliable in operation, and otherwise well adapted to accomplish the objects and advantages pointed out above.

It is apparent that changes in the details of construction, and in the combination and arrangement of parts may be restorted to without departing from the spirit or scope of the invention as hereinafter claimed or sacrificing any of its advantages.

Having thus described my invention, what I claim as new is:

1. A mechanism of the class described including a bracket for engaging the mechanism on the fuselage of an aeroplane, a cylinder supported on the bracket and having a head at the forward end thereof, and a bearing at the rear end thereof, a rod slidable through the bearing, a plate, means for adjustably anchoring the plate on the rod within the cylinder, a spring anchored to the head, coiled about the rod and anchored to the plate, a second bracket, a stabilizer arm pivotally mounted intermediate its ends on the second bracket, and means engaging the upper end of the arm with the forward end of the rod.

2. A mechanism of the class described including a bracket for engaging the mechanism on the fuselage of an aeroplane, a cylinder supported on the bracket and having a head at the forward end thereof, and a bearing at the rear end thereof, a rod slidable through the bearing, a plate, means for adjustably anchoring the plate on the rod within the cylinder, a ring anchored to the head, coiled about the rod and anchored to the plate, a second bracket, a stabilizer arm pivotally mounted intermediate its ends on the second bracket, and means engaging the upper end of the arm with the forward end of the rod, trigger means associated with the rod to hold the spring under tension and the stabilizer arm is in a predetermined position.

3. A mechanism of the class described including a bracket for engaging the mechanism on the fuselage of an aeroplane, a cylinder supported on the bracket and having a head at the forward end thereof, and a bearing at the rear end thereof, a rod slidable through the bearing, a plate, means for adjustably anchoring the plate on the rod within the cylinder, a ring anchored to the head, coiled about the rod and anchored to the plate, a second bracket, a stabilizer arm pivotally mounted intermediate its ends on the second bracket, and means engaging the upper end of the arm with the forward end of the rod, a shoe on the lower end of the stabilizer arm.

4. A mechanism of the class described including a bracket for engaging the mechanism on the fuselage of an aeroplane, a cylinder supported on the bracket and having a head at the forward end thereof, and a bearing at the rear end thereof, a rod slidable through the bearing, a plate, means for adjustably anchoring the plate on the rod within the cylinder, a ring anchored to the head, coiled about the rod and anchored to the plate, a second bracket, a stabilizer arm pivotally mounted intermediate its ends on the second bracket, and means engaging the upper end of the arm with the forward end of the rod, a casing projecting rearwardly from the cylinder, a collar adjustably mounted on the rod within the casing, said collar being provided with a notch, a spring pressed catch in the casing engaged with the notch to hold the spring under tension, and means for releasing the catch.

5. A mechanism of the class described including a bracket for engaging the mechanism on the fuselage of an aeroplane, a cylinder supported on the bracket and having a head at the forward end thereof, and a bearing at the rear end thereof, a rod slidable through the bearing, a plate, means for adjustably anchoring the plate on the rod within the cylinder, a ring anchored to the head, coiled about the rod and anchored to the plate, a second bracket, a stabilizer arm pivotally mounted intermediate its ends on the second bracket, and means engaging the upper end of the arm with the forward end of the rod, a casing projecting rearwardly from the cylinder, a collar adjustably mounted on the rod within the casing, said collar being provided with a notch, a spring pressed catch in the casing engaged with the notch to hold the spring under tension, and means for releasing the catch, a spring pressed latch in the casing, said catch having a notch to receive the spring pressed latch when the catch is released.

6. A mechanism of the class described including a bracket for engaging the mechanism on the fuselage of an aeroplane, a cylinder supported on the bracket and having a head at the forward end thereof, and a bearing at the rear end thereof, a rod slidable through the bearing, a plate, means for adjustably anchoring the plate on the rod within the cylinder, a ring anchored to the head, coiled about the rod and anchored to the plate, a second bracket, a stabilizer arm pivotally mounted intermediate its ends on the second bracket, and means engaging the upper end of the arm with the forward end of the rod, a casing projecting rearwardly from the cylinder, a collar adjustably mounted on the rod within the casing, said collar being provided with a notch, a spring pressed catch in the casing engaged with the notch to hold the spring under tension, and means for releasing the catch, a spring pressed latch in the casing, said catch having a notch to receive the spring pressed latch when the catch is released, a shoe adjustably mounted on the lower end of the arm.

In testimony whereof, I affix my signature.

LOYAL GARRIS.